United States Patent [19]

Schmid

[11] Patent Number: 4,723,107

[45] Date of Patent: Feb. 2, 1988

[54] HYDRAULIC LIFTING MECHANISM

[75] Inventor: Martin Schmid, Niederhornbach, Fed. Rep. of Germany

[73] Assignee: Steinbock GmbH, Moosburg, Fed. Rep. of Germany

[21] Appl. No.: 2,866

[22] Filed: Jan. 13, 1987

[30] Foreign Application Priority Data

Jan. 28, 1986 [DE] Fed. Rep. of Germany ....... 3602510

[51] Int. Cl.$^4$ ............................................. H02P 3/14

[52] U.S. Cl. ..................................... 322/35; 318/139; 320/61; 414/529

[58] Field of Search ........................... 320/61; 290/50; 318/139; 322/35; 414/540, 546, 587, 708, 786, 787, 529

[56] References Cited

U.S. PATENT DOCUMENTS 3,512,072 5/1970 Karazija et al. .................. 320/14 X
3,947,744 3/1976 Grace et al. .......................... 320/61

FOREIGN PATENT DOCUMENTS 2014605 3/1971 Fed. Rep. of Germany .
2226632 12/1973 Fed. Rep. of Germany .
3048999 7/1982 Fed. Rep. of Germany .
3104549 9/1982 Fed. Rep. of Germany .

*Primary Examiner*—R. J. Hickey

*Attorney, Agent, or Firm*—Toren, McGeady & Associates

[57] ABSTRACT

A hydraulic lifting mechanism, particularly suitable for a battery-powered industrial truck, including a hydraulic lifting cylinder, a hydraulic unit, operating as a pump in the load lifting operational mode, and supplying the lifting cylinder with pressure medium, and operating as a motor in the load lowering operational mode during which mode it is actuated by the pressure medium exiting from the lifting cylinder, and a DC generator coupled with the hydraulic unit operating as an electromotor in the load lifting operational mode and as a generator in the load lowering operational mode. A control valve arrangement is provided at the halfway point in the pressure path between the hydraulic cylinder and the hydraulic unit, which is controlled by a lifting mechanism control. In addition, the lifting mechanism control controls a regenerative brake circuit supplied by the DC generator in the load lowering operational mode. The control valve arrangement includes a proportional valve which is opened by the lifting mechanism control in the load lowering operational mode in accordance with a ramp-like function. The regenerative brake circuit is switched on depending on the output current of the DC generator working as a generator, if the generator output current exceeds a predetermined value. Undesirable dropping of the load in the lowering operational mode is hereby prevented during transition to regenerative braking.

13 Claims, 5 Drawing Figures

HYDRAULIC LIFTING MECHANISM

BACKGROUND OF THE INVENTION

1. FIELD OF THE INVENTION

The invention relates to a hydraulic lifting mechanism, particularly for an industrial truck, which includes a hydraulic lifting cylinder and a hydraulic unit used as a pump in a load lifting operation. The hydraulic unit supplies a pressure medium to the lifting cylinder and works as a motor in a load lowering operation actuated by the pressure medium supplied by the lifting cylinder. A DC generator is coupled with the hydraulic unit and functions as an electric motor in the load lifting operation and as a generator in the load lowering operation, and includes a regenerative brake circuit powered by the DC generator in the load lowering operation. A control valve arrangement is located in the center of the pressure path between the hydraulic cylinder and the hydraulic unit, and a lifting mechanism control regulates the regenerative brake circuit and the control valve arrangement.

2. DESCRIPTION OF THE RELATED ART

A hydraulic lifting mechanism of this type is known from the DE-OS No. 20 14 605. In this lifing mechanism for a forklift, the pump, supplying the hydraulic lifting cylinder with hydraulic fluid, is driven by a DC shunt motor powered by the battery of the vehicle, the lifting cylinder lifting the load. The pump is a rotary piston pump whose output quantity can be reset steplessly from pump operation to motor operation by actuation of a regulator. When lowering the load, the pump is operated as a hydraulic motor, which drives the DC shunt motor operating as a generator in a regenerative braking operation. The potential charging energy of the lifted load is converted into electric energy charging the battery during lowering of the load in the regenerative braking operation.

In the lifting mechanism of the previously explained type, the lowering speed of the load is determined by the braking torque produced by the DC shunt motor. Since the DC shunt motor does not produce a braking torque when it is not operating, a controllable shut-off valve is installed between the hydraulic motor and the hydraulic cylinder, which, in the blocked state, shuts off the hydraulic fluid flow from the hydraulic cylinder to the hydraulic motor. When the load is lowered from the stopped position, this shut-off valve is opened. In conventional lifing mechanisms of the type under discussion, the load hereupon drops while accelerating the generator, until the generator produces an adequate counter torque in order to stop the load.

SUMMARY OF THE INVENTION

It is an object of the invention to provide a hydraulic lifting mechanism of the previously explained type, with which the load can be lowered in the regenerative braking operation mode, without it unintentionally and uncontrollably dropping at the start of the lowering operation.

This object is achieved in a hydraulic lifting mechanism of the subject invention characterized in that the control valve arrangement exhibits a proportional valve, and that the lifting mechanism control opens the proportional valve corresponding to a ramp-like function in load operation and, depending on the output current of the DC generator functioning as a generator, activates the regenerative brake circuit when the generator output current exceeds a predetermined value.

In such a lifting mechanism, the load is, to begin with, lowered in a controlled manner by the proportional valve with increasing pressure medium throughput. The lowering speed is determined by the opening amount of the proportional valve. The lifting mechanism control monitors the output current of the DC generator, functioning as a generator, and switches on the regeneration brake circuit for electrical braking of the lowering motion, as soon as a sufficiently large braking torque is capable of being exerted upon the hydraulic motor. This type of control prevents initial unintentional and uncontrolled dropping of the load during transition into the lowering operation mode.

After transition to the regenerative braking mode of the lowering process, the proportional valve is completely opened. The lowering speed is then maintained at a desired predetermined rate by conventional regulation of the excitation of the DC generator. The lowering speed may be selectively increased; however, it may also be reduced, particularly compared to the speed at which the transition to regenerative braking occurs. The lifting mechanism control may comprise an additional rpm regulator which is additional to the control of the excitation of the DC generator, this rpm regulator maintaining the excitation of the DC generator at a predetermined desired rpm value depending on an rpm sensor sensing the rpm thereof.

After the regenerative brake circuit has been activated, the lowering speed of the load may be varied within wide limits. By regulation of the excitation of the DC generator, the lowering speed can be lowered to an approximately zero value. In a preferred embodiment, it is provided that the proportional valve can be closed in accordance with a ramp-like function when a stop condition is approached, so that switch-off shocks are avoided.

In an appropriate embodiment of the control valve arrangement placed between the hydraulic unit and the hydraulic cylinder, the control valve arrangement comprises, in series with the proportional valve, two check valves opening in opposite directions, which may be bypassed by magnetic shut-off valves. A third check valve, opening in lifting direction, bypasses the proportional valve. The advantages of such a control valve arrangement is its comparatively uncomplicated valve arrangement.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENT

Figure 1:
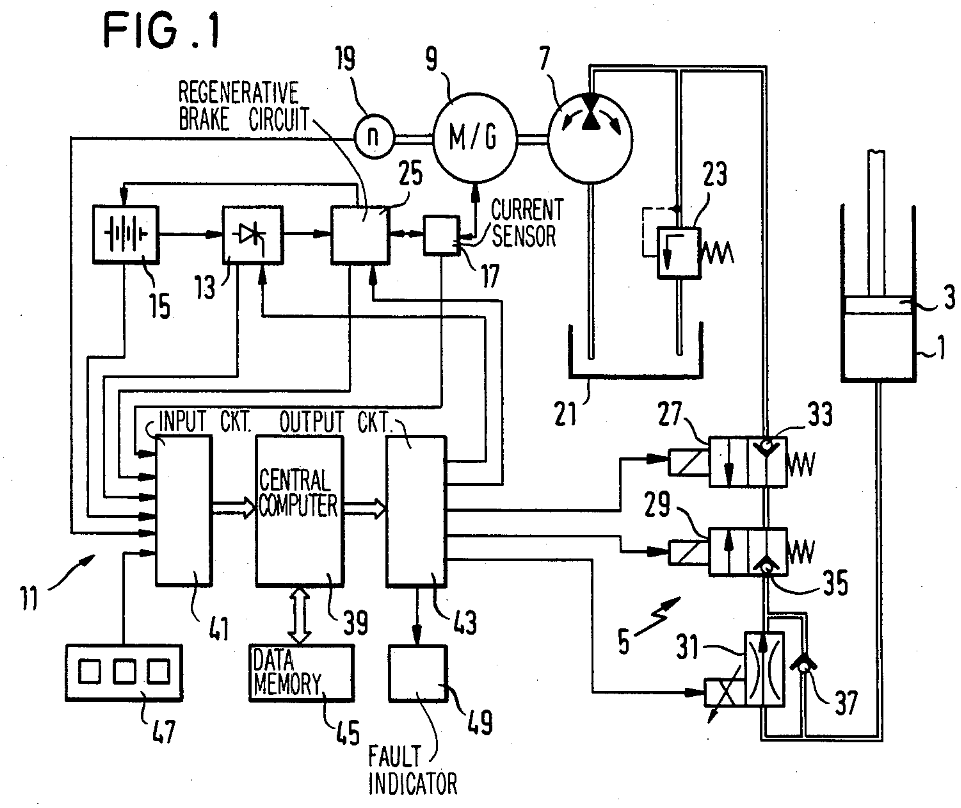
FIG. 1 is a block schematic circuit diagram of a hydraulic lifting mechanism.

FIG. 1 shows a hydraulic lifting cylinder 1 having a piston 3 for lifting or lowering lifting means (not shown) of a battery-powered industrial truck, for example, a forklift or the like. The lifting cylinder 1 is connected to a reversible hydraulic motor 7 which is operable as a pump through a control valve arrangement 5. The hydraulic motor 7 may, for example, be a gear wheel motor. The hydraulic motor 7 is coupled to a DC generator 9, which may be operated either as a generator or a motor, the excitation thereof, in the motor as well as the generator operation, being regulated by a lifting mechanism control 11. The DC generator 9 is connected, through a thyristor control 13, with an accumulator or battery 15. The lifting mechanism control 11 responds to the excitation of the DC generator 9 by means of a current sensor 17 and controls the thyristor circuit 13, operating in chopper operation, in such a manner that a predetermined magnitude of the excitation, selectable by the lifting mechanism control 11, and thus, a predetermined value of the torque of the DC generator 9 can be maintained. An rpm transmitter 19 is coupled to the shaft of the hydraulic motor 7, which transmits a signal corresponding to the rpm of the hydraulic motor 7 to the lifting mechanism control 11. The lifting mechanism control 11 comprises regulation means, which, depending on the determined rpm, influences the excitation of the DC generator 9 through the thyristor control 13 in such a way that a predetermined desired rpm can be maintained in motor operation, as well as in generator operation. Since the rpm of the hydraulic motor 7 is proportional to the medium throughput, the lifting or lowering speed of the piston 3 can be regulated in this manner.

In the loading lifting operation, the DC generator 9 acts as a motor and drives the hydraulic motor 7 in such a rotational direction that hydraulic fluid is conveyed from a tank 21 through the control valve arrangement 5 and into the hydraulic cylinder 1. A pressure relief valve 23 at the output of the hydraulic motor 7 limits the output pressure thereof. The lifting mechanism control 11 controls the DC generator 9 excitation such that the rpm of the hydraulic motor 7, operating as a pump, and thus, the lifting speed of the piston 3 has a predetermined value.

In the lowering operation, the piston 3 conveys, under the influence of the load, the hydraulic fluid back through the control valve arrangement 5 and into the tank 21. The hydraulic motor 7 operates in motor operation and drives the DC generator 9, operating as a generator. The armature circuit of the DC generator 9 is connected to the battery 5 through a regenerative brake circuit 25. The regenerative brake circuit 25 permits regenerative braking of the DC generator 9 when operated as a generator, wherein at least a portion of the current produced in the generator operation, is used for charging the battery 15. In the regenerative braking operation, the excitation of the DC generator 9 is controlled in such a way by the thyristor control 13, that the DC generator 9 exerts a predetermined braking torque on the hydraulic motor 7 and, additionally, the hydraulic motor 7 is maintained at a predetermined rpm corresponding to the predetermined load lowering speed.

The control valve arrangement 5 comprises a series arrangement of two magnetic shut-off valves 27 and 29 and a proportional valve 31. The normally closed magnetic shut-off valve 27 includes a check valve 33 opening in the lowering flow direction of the hydraulic fluid as a bypass of the closed position of the magnetic shut-off valve 27.

The magnetic shut-off valve 29 is also normally closed and has a check valve 35 opening in the load lifting flow direction of the hydraulic fluid as a bypass of the closed position of the magnetic shut-off valve 29. An additional check valve 37 is arranged to open in the load lifting flow direction in a bypass line of the proportional valve 31. The magnetic shut-off valves 27 and 29 and the proportional valve 31 are controlled by the lifting mechanism control 11.

The lifting mechanism control 11 is designed, preferably, as a microprocessor control and comprises a central computer 39, an input circuit 41, an output circuit 43 and a programming and data memory 45. The input circuit 41 feeds input data from the current sensor 17, the rpm transmitter 19 and an operator keyboard or panel 47 to the central computer 39. The operator keyboard 47 may switch between the lifting operation and the lowering operation, and the desired speed when lifting or lowering can be adjusted therewith. The input circuit 41 also receives feedback data from the regenerative brake circuit 25 and the thyristor control 13, as well as data about the state of charge of the battery 15. To the extent that the data are available in analog form, they are converted into digital data in the input circuit 41. The output circuit 43 controls the chopper operation of the thyristor control 13 and the switchover operation of the regenerative brake circuit 25. The output circuit 43 also generates control signals for exciting the magnetic shut-off valves 27 and 29 and for controlling the proportional valve 31. A fault indicator 49 is furthermore connected to the output circuit 43 for generating alarm and malfunction signals.

In simple embodiment forms of the lifting mechanism control 11, the rpm transmitter 19 may be eliminated so that the excitation of the DC generator 9, in generator or motor operation, is maintained at a desired value without taking into account the momentary rpm thereof. Instead of the current sensor 17 responding to the current of the DC generator 9, a sensor responding to the generator voltage may also be provided for determining the momentary value of excitation of the DC generator 9.

In the load lifting operation, the magnetic shut-off valve 27 is open, and hydraulic fluid from tank 21 is pumped into the hydraulic cylinder 1 through the magnetic shut-off valve 27 and the check valves 35, 37. In the lowering operation, control is provided by the lifting mechanism control 11 through the magnetic shut-off valve 29 and the also normally closed proportional valve 31.

Figure 2:
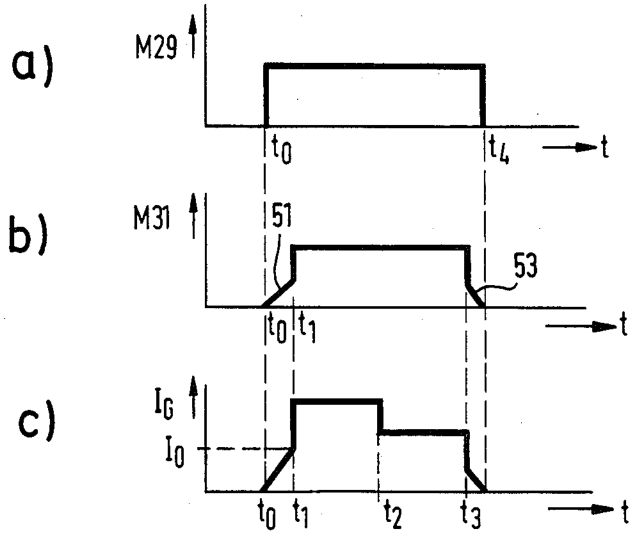
FIGS. 2*a, b* and *c,* are waveform diagrams of control signals of the lifting mechanism in FIG. 1.

FIG. 2*a* shows the waveform diagram of the control signal M29 supplied by the lifting mechanism control 11 to the magnetic shut-off valve 29. The waveform diagram of the control signal M31 supplied to the proportional valve 31 is depicted in FIG. 2*b*. FIG. 2*c* shows the waveform diagram of the excitation current $I_G$ of the DC generator 9 operating in the generator mode. At the instant $T_O$, an order for lowering the load with a predetermined lowering speed is given at the operator keyboard 47. The lifting mechanism control 11 herein opens the magnetic shut-off valve 29 and generates a ramp-shaped signal 51, which causes the proportional valve 31 to open in a constantly increasing manner. The lowering speed is determined by the increasingly opening cross-section of the proportional valve 31 corresponding to the ramp-like signal. The regenerative brake circuit 25 is switched to the active mode. As soon as the armature current of the DC generator 9, determined by the lifting mechanism control 11 through the sensor 17, is sufficient to retain the load resting upon the piston 3 by the braking torque of the DC generator 9, the regenerative braking operation is switched on by the regenerative brake circuit 25 and the proportional valve 31 is completely opened. In the FIG. 2*c*, the switchover current $I_O$ is reached at the instance $t_1$. After the regenerative braking operation has been switched on, the rpm of the hydraulic motor 7 is regulated to maintain the desired value, set up at the operator keyboard 47, by the excitation of the DC generator 9. This desired value may be varied in the course of the lowering operation, as is depicted in FIG. 2*c* for the instance $t_2$. The lifting mechanism control 11 permits not only a jerk-free initiation of the load lowering operation mode, but also the jerk-free termination. If, at the instance $t_3$, the desired value of the lowering speed is adjusted to be zero by means of the operator's panel 47, then, to begin with, the lowering speed is reduced through electrical control of the DC generator 9 down to nearly a complete stop. The lifting mechanism control 11 then generates a ramp-like signal 53 continuously closing the proportional valve 31. The magnetic shut-off valve 29 is also closed at the instant $t_4$ while the proportional valve 31 is also closed.

Figure 3:
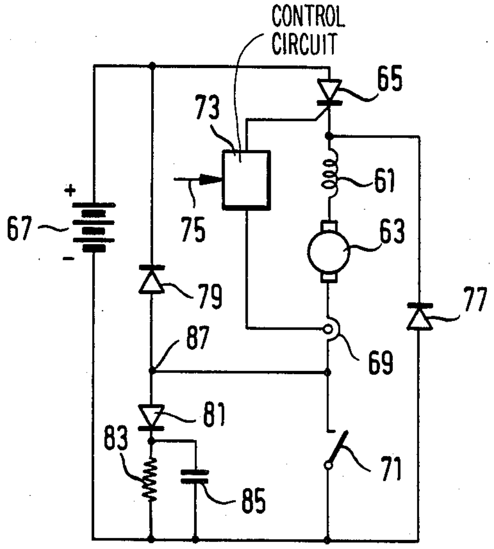
FIG. 3 is a circuit diagram of a regenerative brake circuit for use in the lifting mechanism in FIG. 1.

FIG. 3 shows a preferred embodiment of a regenerative brake circuit for a DC series wound generator with an armature 63 in series with a field winding 61. The field winding 61 is connected to the positive terminal of a battery 67 through a thyristor 65. The armature 63 is connected to a controllable switch 71 through a current sensor 69, corresponding to the current sensor 17 in FIG. 1, for example, a shunt resistance, which connects the armature 63 with the negative pole of the battery 67. A control circuit 73, which includes a conventional quenching circuit for the thyristor 65, controls the thyristor 65 in the chopping operational mode and determines the pulse duration and pulse period of the current flowing through the field winding 61 of the armature 63. The current, detected by the current sensor 69, is maintained at a desired value presettable at 75. A recovery or freewheeling diode 77 is shown in parallel with the field winding 61, such as is used for thyristor quenching circuits of conventional construction.

In the load lifting operation mode, the switch 71 is closed and the pulse-shaped motor current flows through the thyristor 65, the field winding 61, the sensor 69 and the switch 71.

By opening the switch 71, the regenerative brake circuit is put into operation. The regenerative brake circuit comprises a diode 79 having a cathode connected to the positive terminal of the battery 67 and an anode connected through the sensor 69 to the armature 63. The diode 79 is in parallel with the series circuit consisting of the thyristor 65, the field winding 61, the armature 63 and the sensor 69. The anode of the diode 79 is further connected to the anode of an additional diode 81, whose cathode is connected to the negative terminal of the battery 67 through a resistance 83. A condenser 85 is connected in parallel with the resistance 83. The switch 71 constitutes a short-circuit for the series circuit consisting of the diode 81 and the resistance/condenser 83/85. While in the course of the load-lifting operation mode, the connecting point 87 is maintained at the potential of the negative terminal of the battery 67 through the closed switch 71. The potential at the point 87 with the switch 71 opened during the load lowering operation mode, can increase to a magnitude which is higher than the potential at the positive terminal of the battery 67 because of the voltage generated by the armature 63. At this stage, the diode 79 becomes conductive and a charging current flows into the battery 67. Excitation of the field winding 61 is also controllable by the thyristor 65 in this operational mode.

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. A hydraulic lifting mechanism for a battery-powered industrial truck, having a hydraulic lifting cylinder; a hydraulic unit operating pump in a load lifting operational mode, in which a pressure medium is supplied to the lifting cylinder, and operating as a motor in a load lowering operational mode, in which the pressure medium exiting from the lifting cylinder powers the hydraulic unit; a DC generator coupled to the hydraulic unit which operates as an electromotor in the load lifting operational mode and as a generator in the load lowering operational mode; a regenerative brake circuit supplied by the DC generator in the load lowering operational mode; a control valve arrangement located in a pressure path between the hydraulic cylinder and the hydraulic unit; and a lifting mechanism control controlling the regenerative brake circuit and the control valve arrangement; characterized in that the control valve arrangement comprises a proportional valve, wherein the lifting mechanism control opens the proportional valve in accordance with a ramp-like function in the load lowering operational mode and activates the regenerative brake circuit, depending on an output current of the DC generator operating as a generator, if the generator output current exceeds a predetermined value.

2. The hydraulic lifting mechanism according to claim 1, characterized in that the lifting mechanism control comprises an rpm regulating arrangement influencing an excitation current of the DC generator operated as a generator, by means of which the rpm of the hydraulic unit is regulated to a predetermined desired value in the load lowering operational mode.

3. The hydraulic lifting mechanism according to claim 1 or 2, characterized in that the lifting mechanism control closes the proportional valve according to a ramp-like function during transition from the load lowering operational mode to a stopped state.

4. The hydraulic lifting mechanism according to claim 1 or 2, characterized in that the control valve arrangement comprises three check valves in series between the lifting cylinder and the hydraulic unit, of which a first of said check valves open in a load lowering flow direction of the pressure medium and a second and a third of said check valves open in a load lifting flow direction of the pressure medium, the control valve arrangement further comprising two normally closed magnetic shut-off valves which are to be opened by the lifting mechanism control, of which a first of said magnetic shut-off values is arranged in parallel with the first check valve and is opened during the load lifting operational mode and the second of said magnetic shut-off valves is arranged in parallel with the second check valve and is opened during the load lowering operational mode, the proportional valve being arranged in parallel with the third check valve.

5. The hydraulic lifting mechanism according to claim 1 or 2, characterized in that the hydraulic unit comprises a reversible gear wheel motor operable as a pump.

6. The hydraulic lifting mechanism according to claim 1 or 2, characterized in that the DC generator comprises a series wound motor operable as a generator in the load lowering operational mode.

7. The hydraulic lifting mechanism according to claim 3, characterized in that the control valve arrangement comprises three check valves in series between the lifting cylinder and the hydraulic unit, of which a first of said check valves opens in a load lowering flow direction of the pressure medium and a second and a third of said check valves open in a load lifting flow direction of the pressure medium, the control valve arrangement further comprising two normally closed magnetic shut-off valves which are to be opened by the lifting mechanism control, of which a first of said magnetic shut-off values is arranged in parallel with the first check valve and is opened during the load lifting operational mode and the second of said magnetic shut-off valves is arranged in parallel with the second check valve and is opened during the load lowering operational mode, the proportional valve being arranged in parallel with the third check valve.

8. The hydraulic lifting mechanism according to claim 3, characterized in that the hydraulic unit comprises a reversible gear wheel motor operable as a pump.

9. The hydraulic lifting mechanism according to claim 4, characterized in that the hydraulic unit comprises a reversible gear wheel motor operable as a pump.

10. The hydraulic lifting mechanism according to claim 7, characterized in that the hydraulic unit comprises a reversible gear wheel motor operable as a pump.

11. The hydraulic lifting mechanism according to claim 3, characterized in that the DC generator comprises a series wound motor operable as a generator in the load lowering operational mode.

12. The hydraulic lifting mechanism according to claim 4, characterized in that the DC generator comprises a series wound motor operable as a generator in the load lowering operational mode.

13. The hydraulic lifting mechanism according to claim 5, characterized in that the DC generator comprises a series wound motor operable as a generator in the load lowering operational mode.

* * * * *